United States Patent
Lake et al.

(10) Patent No.: US 11,935,432 B2
(45) Date of Patent: Mar. 19, 2024

(54) MECHANICAL TRIGGER DEVICE AND METHODS THEREOF

(71) Applicant: AMI Industries, Inc., Colorado Springs, CO (US)

(72) Inventors: Scott A. Lake, Colorado Springs, CO (US); David Linden Gough, Monument, CO (US); Jeff Benjamin, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 986 days.

(21) Appl. No.: 16/824,437

(22) Filed: Mar. 19, 2020

(65) Prior Publication Data
US 2021/0293501 A1    Sep. 23, 2021

(51) Int. Cl.
*G09B 9/08* (2006.01)
*B64D 25/10* (2006.01)

(52) U.S. Cl.
CPC .............. *G09B 9/085* (2013.01); *B64D 25/10* (2013.01); *Y10T 403/602* (2015.01)

(58) Field of Classification Search
CPC .................................................... B64D 25/10
See application file for complete search history.

(56) References Cited

U.S. PATENT DOCUMENTS

| 4,028,948 A | 6/1977 | Frost et al. |
| 7,762,174 B1 | 7/2010 | Steimke et al. |

FOREIGN PATENT DOCUMENTS

| CN | 107813944 | 3/2018 |
| CN | 108033035 | 5/2018 |
| CN | 108033018 | 12/2019 |
| RU | 2669720 | 10/2018 |
| WO | 2018074636 | 4/2018 |

OTHER PUBLICATIONS

European Patent Office, European Search Report dated Jul. 26, 2021 in Application No. 21163367.2.

*Primary Examiner* — Benjamin P Lee
(74) *Attorney, Agent, or Firm* — SNELL & WILMER L.L.P.

(57) ABSTRACT

A mechanical trigger device comprises a reset screw configured to re-assemble the mechanical trigger device. The resettable screw may be disposed in a slot in a housing of the mechanical trigger device and coupled to a firing pin disposed within the housing. The reset screw may be configured to translate the firing pin within the housing and re-engage a sear after use of the mechanical trigger device.

14 Claims, 7 Drawing Sheets

MECHANICAL TRIGGER DEVICE AND METHODS THEREOF

FIELD

The present disclosure relates to mechanical trigger devices, and more specifically, to mechanical trigger devices configured for re-assembly of a sear and a firing pin.

BACKGROUND

Ejection systems are designed to expel pilots from an aircraft cockpit. Ejection seats in high performance aircraft benefit from safely removing the pilot or other occupant from the disabled aircraft across a wide variety of aircraft speed regimes, altitudes and aircraft attitudes. Occupants of aircrafts may never exert an amount of force to pull an evacuation handle, unless the occupant experiences an event where the pilot is ejected from the aircraft.

SUMMARY

A mechanical trigger device is disclosed herein. The mechanical trigger device may comprise: a housing having a slot disposed therethrough; a firing pin disposed in the housing; a spring wrapped around the firing pin; and a reset screw extending radially outward through the firing pin, the reset screw configured to hold the firing pin in a fixed position against a force of the spring.

In various embodiments, the slot may comprise an axial portion and a circumferential portion. The housing may comprise a first counterbore disposed at a first end of the housing extending axially through the housing and a second counterbore disposed axially opposite the first counterbore. The firing pin may comprise a retention end and a firing pin engagement end, and the spring is disposed between the retention end and the second counterbore. The mechanical trigger device may further comprise a sear configured to engage the firing pin, wherein the sear may comprise a sear engagement end configured to engage the firing pin engagement end. The first end may be configured to receive the sear, and a second end of the housing may be configured to be coupled to a conduit. The sear may be configured to disengage and re-engage the firing pin.

An ejection seat ejection initiation force simulation system is disclosed herein. The ejection seat ejection initiation force simulation system may comprise: an ejection handle; and a mechanical trigger device operably coupled to the ejection handle, the mechanical trigger device configured to release in response to pulling the ejection handle, the mechanical trigger device configured to be re-set to an assembled state after pulling the ejection handle.

In various embodiments, the mechanical trigger device may comprise a reset screw coupled to a firing pin, wherein the firing pin is disposed in a housing of the mechanical trigger device, and wherein the reset screw is configured to hold the firing pin in a fixed position against a force of the spring. The ejection imitator simulation device may further comprise a conduit and a rod, wherein the rod is coupled to a sear of the mechanical trigger device, and wherein the conduit is coupled to a second end of the mechanical trigger device. The rod may be configured to translate the sear away from a housing of the mechanical trigger device in response to pulling of the ejection handle. The sear may comprise a sear engagement end, wherein the mechanical trigger device further comprises a firing pin having a firing pin engagement end, and wherein the firing pin engagement end engages the sear engagement end in the assembled state. The mechanical trigger device may further comprise a spring disposed around the firing pin. The mechanical trigger device may comprise a housing and a reset screw, wherein a slot is disposed in the housing, wherein the slot includes an axial portion and a circumferential portion, and wherein the reset screw extends radially outward from the slot. The reset screw may be coupled to a firing pin of the mechanical trigger device. The mechanical trigger device may comprise: a housing having a slot disposed therethrough; a firing pin disposed in the housing; a spring wrapped around the firing pin; a sear configured to engage the firing pin; and a reset screw extending radially outward through the firing pin, the reset screw the reset screw configured to hold the firing pin in a fixed position against a force of the spring. The mechanical trigger device may further comprise a conduit and a rod, wherein the rod is coupled to the sear, and wherein the conduit is operably coupled to the ejection handle. The conduit may be in fluid communication with an ignitor.

A method of using an mechanical trigger device is disclosed herein. The method may comprise: releasing a sear of the mechanical trigger device from engagement with a firing pin; translating the firing pin proximate a first counterbore at a first end of a housing; re-engaging the sear with the firing pin; and translating the firing pin and the sear away from the first end proximate a second counterbore of the housing.

In various embodiments, the method may further comprise re-releasing the sear from engagement with the firing pin.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

A mechanical trigger device is disclosed herein. The mechanical trigger device may include a sear that may be removably coupled to a firing pin. The mechanical trigger device may be configured to release the firing pin by decoupling the sear from the firing pin. The mechanical trigger device may further be configured to be re-set to a loaded position by holding the firing pin against a spring force to allow re-coupling of the sear to the firing pin. In this regard, the mechanical trigger device may be used in any mechanical trigger system, such as ejection seat application including emergency backup batteries, drogue parachutes, recovery parachute reefing line cutters, and non-ejection seat applications including sear devices. Although this application is disclosed with respect to an ejection simulation system, any system where the desire is to re-use the mechanical trigger for purposes of simulation of sear actuation forces or any other purpose needing re-use of a sear trigger is within the scope of this disclosure.

Figure 1A:
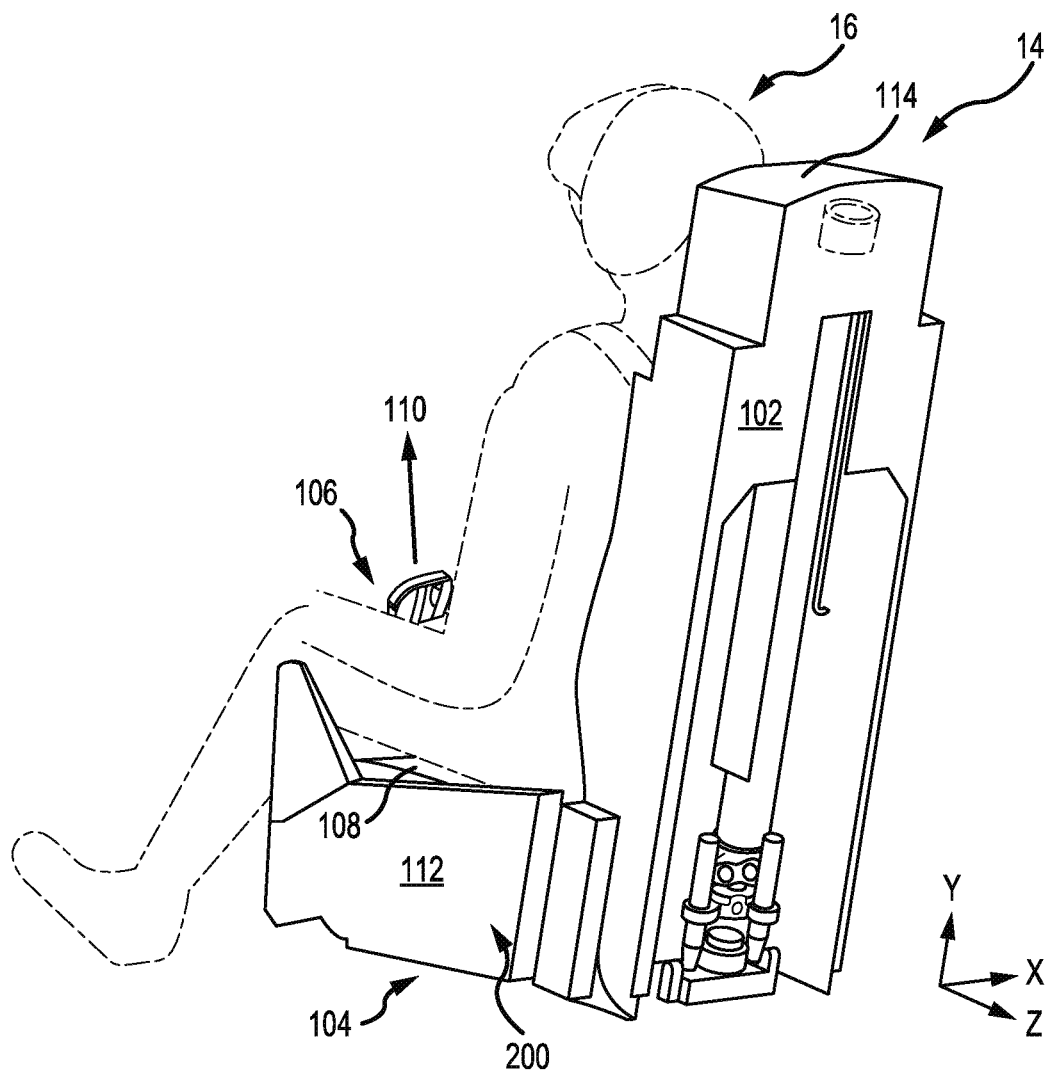
FIG. 1A illustrates an ejection seat, in accordance with various embodiments.

Referring now to FIG. 1A, ejection seat 14 is illustrated, in accordance with various embodiments. Ejection seat 14 includes a seat back 102 and a seat pan 104. In various embodiments, an ejection handle 106 may be located proximate a front 108 of seat 104. The seat 104 may house an ejection simulation system 200, in accordance with various embodiments. Front 108 of seat pan 104 is generally opposite, or distal, seat back 102. While FIG. 1A shows ejection handle 106 located at front 108 of seat 104, it is further contemplated and understood that ejection handle 106 may be located anywhere that is accessible to an occupant of ejection seat 14. In various embodiments, ejection seat 14 may allow an occupant (e.g., a trainer pilot), to pull ejection handle 106 and/or experience a simulated force 110 to pull the ejection handle. The simulated force may correspond to a typical force a pilot may experience when ejecting from an aircraft. Upon pulling ejection handle 106, an ejection simulation device may release. The ejection simulation device may be configured to reset to an initial position after the ejection simulation device has been released. In this regard, the ejection seat 14 may be reused to train pilots for ejection scenarios. In various embodiments, the ejection simulation system 200 may allow testing of various components of an ejection system, such as the ejection handle 106 and components connected to the ejection simulation device.

Figure 1B:
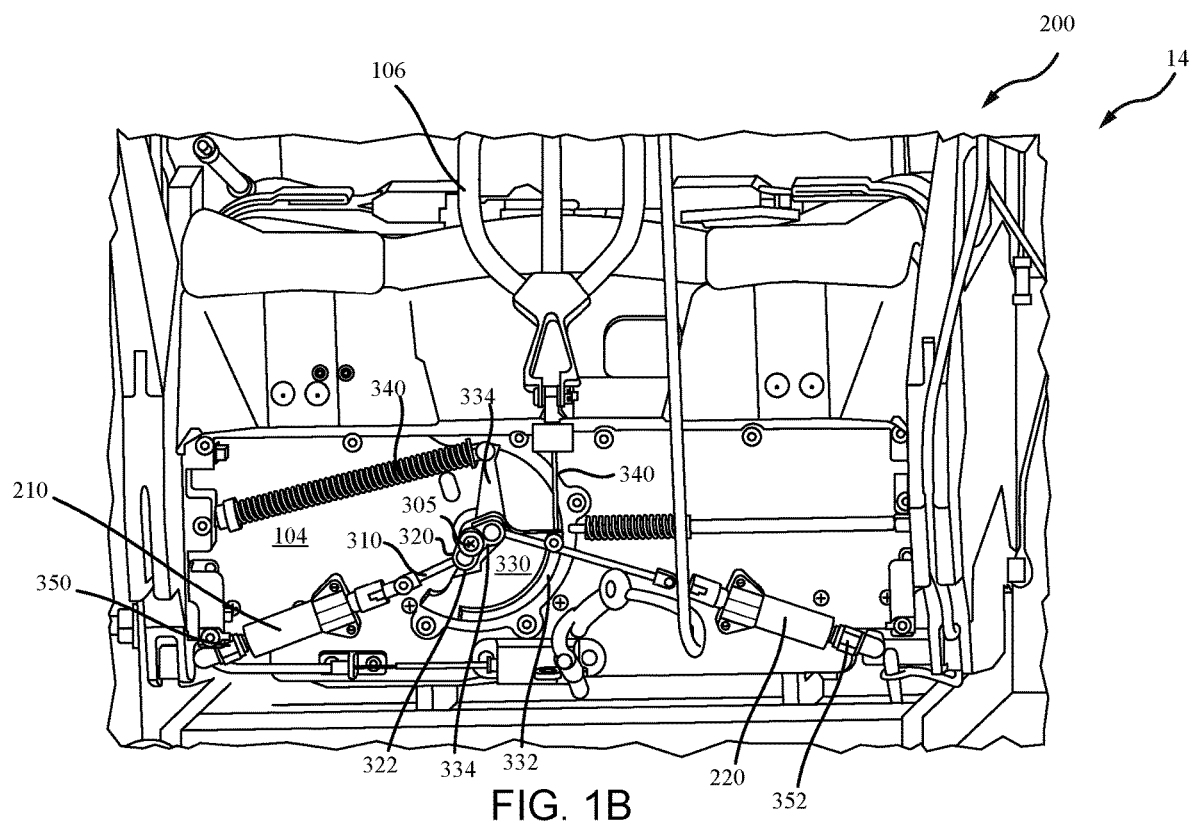
FIG. 1B illustrates an ejection seat having an ejection simulation system, in accordance with various embodiments.

Referring now to FIG. 1B, ejection seat 14 is illustrated with a cover removed to view the components of an ejection initiation simulation system, in accordance with various embodiments. Ejection seat 14 may comprise an ejection simulation system 200, in accordance with various embodiments. In various embodiments, the ejection sequence initiation simulation system comprises an ejection handle 106 and a first ejection sequence initiation simulation ballistic device 210. The first ejection sequence initiation simulation ballistic device 210 may be operably coupled to the ejection handle 106. In this regard, upon pulling the ejection handle 106, the first ejection simulation device may be released and/or simulate a force for pulling an ejection handle 106 in an ejection seat of an aircraft.

For example, the first ejection sequence initiation simulation ballistic device 210 may be coupled to a fork flange 322 of a mount 320 pivotable about a fulcrum 305. The mount 320 may be coupled to a lever apparatus 330 and the seat pan 104. The lever apparatus 330 may comprise a first lever 332 extending from the fulcrum 305 and a second lever 334 extending from the fulcrum 305. The first lever 332 may be coupled to the ejection handle 106 by a cable 305, or the like. The cable 305 may be coupled to the first lever 332 at a radial distance from the fulcrum 305. In this regard, the lever apparatus 330 may comprise a moment arm from the fulcrum 305. Similarly, the second lever 334 may extend from the fulcrum 305 radially outward. The second lever 334 may be coupled to the seat pan 104 via a spring 340, or the like. The spring 340 may compress upon pulling the ejection handle 106 and return to an initial position upon activation of the first ejection sequence initiation simulation ballistic device 210. The mount 320 and the lever apparatus 330 may be configured to rotate together about fulcrum 305. In this regard, as lever apparatus 330 rotates, mount 320 may rotate, and rod 310 may pull away from first ejection sequence initiation simulation ballistic device 210 until first ejection sequence initiation simulation ballistic device 210 is activated, at which point the spring 340 may force the lever apparatus back to its initial position.

In various embodiments, the ejection simulation system 200 may further comprise a second ejection sequence simulation ballistic device 220 disposed opposite the first ejection sequence initiation simulation ballistic device 210 In this regard, the second ejection sequence simulation ballistic device 220 may be provided to simulate a redundant ejection device of a typical ejection system for an aircraft. The second ejection sequence simulation ballistic device 220 may be coupled to a second fork flange 324 of the mount 320 by a rod 312. In this regard, as the mount 320 rotates about the fulcrum 305, both rod 310 and rod 312 may pull away from their respective ejection simulation device (e.g., first ejection sequence initiation simulation ballistic device 210 and second ejection sequence simulation ballistic device 220) until at least one of the ejection sequence simulation ballistic devices 210, 220 activates.

In various embodiments, the ejection simulation system 200 may further comprise a first conduit 350 and/or a second conduit 360. The first conduit 350 may be coupled to the first ejection sequence initiation simulation ballistic device 210. Similarly, the second conduit 352 may be coupled to the second ejection sequence simulation ballistic device 220. The first conduit 350 may be fluidly coupled to an ignitor configured to eject evacuation seat 14 in a typical ejection system. Similarly, second conduit 352 may be fluidly coupled to an ignitor configured to eject evacuations seat 14 in a typical ejection system. In this regard, a typical ejection initiator may replace first ejection sequence initiation simulation ballistic device 210 and/or second ejection sequence simulation ballistic device 220, resulting in a typical ejection seat for use in an aircraft.

Figure 2:
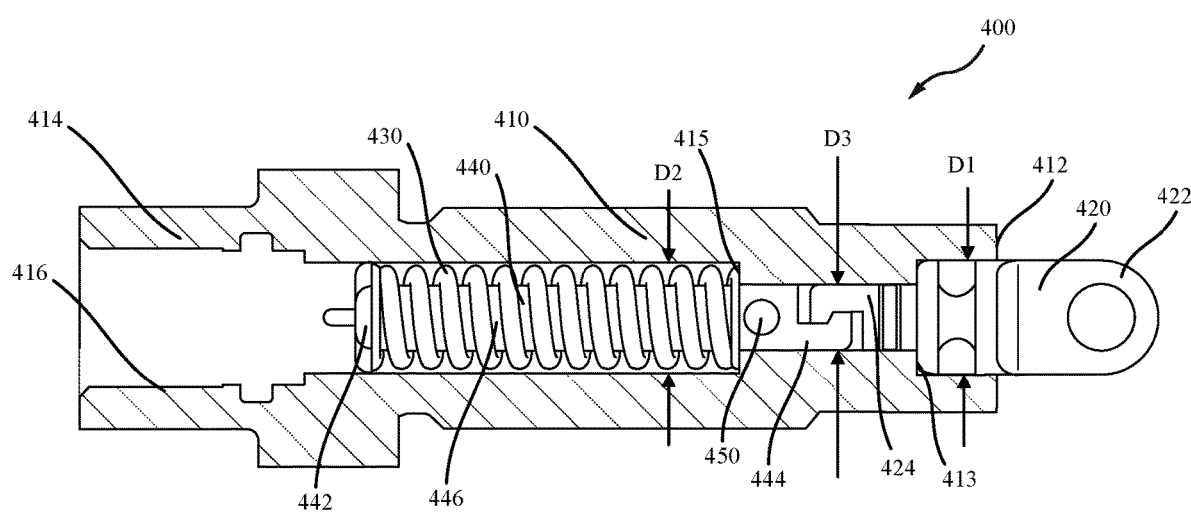
FIG. 2 illustrates a cross-sectional view of an mechanical trigger device, in accordance with various embodiments.

Referring now to FIG. 2, a cross-sectional view of a mechanical trigger device in an assembled state, in accordance with various embodiments, is illustrated. In various embodiments, first ejection sequence initiation simulation ballistic device 210 and/or the second ejection sequence simulation ballistic device 220 may be in accordance with the mechanical trigger device 400. In various embodiments, the mechanical trigger device 400 comprises a housing 410, a sear 420, and a spring 430, and a firing pin 440. The housing 410 comprises a first end 412 and a second end 414. The first end 412 may include a counterbore 413 extending in an axial direction from the first end 412 to the second end 414. Similarly, the second end 414 may include a counterbore 415 extending in an axial direction toward the first end. In this regard, an aperture extending through the housing 410 may be defined by various diameters. For example, proximate the first end 412, housing 410 may define an inner diameter D1, between first end 412 and second end 414, housing 410 may define an inner diameter D2, and between inner diameter D1 and inner diameter D2, housing 410 may define an inner diameter D3. In various embodiments, D1 may be greater than D3 and D2 may be greater than D3.

In various embodiments, the sear 420 may comprise a coupling end 422, an engagement end 424, and shoulder mating portion 426. The coupling end 422 may be configured to be coupled to a rod (e.g., rod 310 or rod 312 from FIG. 1B). The shoulder mating portion 426 may be configured to mate with the counterbore 413 of first end 412 in an assembled state of the mechanical trigger device 400. The shoulder mating portion 426 may be disposed between the coupling end and the engagement end.

In various embodiments, the firing pin 440 may comprise a retention end 442, engagement end 444, and an elongated body 446. The elongated body 446 may extend from the retention end 442 to the engagement end 444. The spring 430 may be wrapped around the elongated body 446 and extend from the retention end 442 to a shoulder defined by counterbore 415. In an assembled state, the spring 430 may be in a neutral position or a compressed state. In various embodiments, in the assembled state, the engagement end 444 of the firing pin 440 may engage the engagement end 424 of the sear 420. In this regard, as the sear 420 translates axially away from the housing 410, the sear 420 and the firing pin 440 may move together and/or compress spring 430 between the retention end 442 of the firing pin 440 and the counterbore 415. As such, with combine reference to FIG. 1B and FIG. 2, a force to activate a typical ejection initiator may be simulated by pulling ejection handle 106, translating rod 310, and pulling the sear 420 axially away from housing 410.

In various embodiments, second end 414 may be configured to be coupled to a conduit (e.g., first conduit 350 or second conduit 352 from FIG. 1B). For example, second end 414 may comprise a threaded radially inner surface 416. The threaded radially inner surface 416 may be configured to be coupled to a threaded radially outer surface of first conduit 350 and/or second conduit 352.

In various embodiments, the mechanical trigger device 400 may further comprise a reset screw 450 coupled to the firing pin 440 proximate the engagement end 444. In this regard, after the mechanical trigger device is used (i.e., the sear 420 is pulled and disengages the firing pin 440, the firing pin 440 may be pulled axially toward counterbore 413, then the engagement end 424 of sear 420 may re-engage the engagement end 444 of the firing pin 440, and the mechanical trigger device 400 may be re-set to the assembled state shown in FIG. 2.

Figure 3:
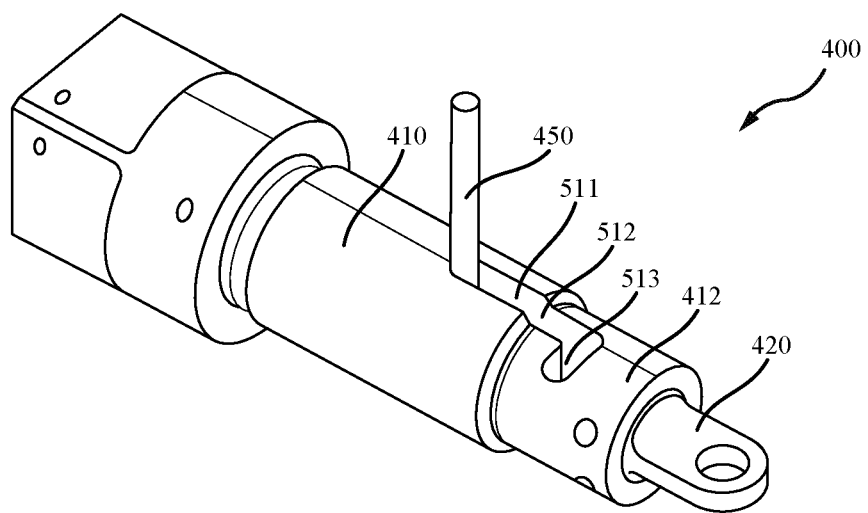
FIG. 3 illustrates a perspective view of an mechanical trigger device, in accordance with various embodiments.

Referring now to FIG. 3, a perspective view of the mechanical trigger device 400, in accordance with various embodiments, is illustrated. The housing 410 may further comprise a slot 511. The slot 511 may comprise an axial portion 512 and a circumferential portion 513. With combined reference to FIGS. 2 and 3, the axial portion 512 may extend from a location proximate counterbore 415 to a location proximate counterbore 413. The reset screw 450 may extend radially outward from the firing pin 440 through the slot 511 and outward of the housing 410. In this regard, after the mechanical trigger device 400 is used and the sear 420 is separated from the housing, the reset screw 450 may be pulled axially toward first end 412 of the housing 410 and locked in the circumferential portion of the slot 511. In this regard, the engagement end 444 of the firing pin 440 may be disposed proximate counterbore 413 of the housing to be re-engaged with the engagement end 424 of the sear 420 and re-set to the assembled state shown in FIG. 2.

Figure 4A:
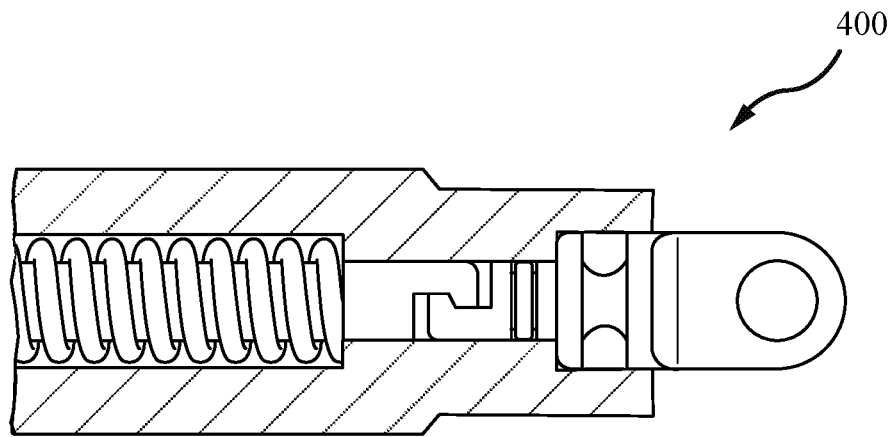
FIGS. 4A, 4B, 4C, and 4D illustrate an mechanical trigger device in use, in accordance with various embodiments.
Figure 4B:
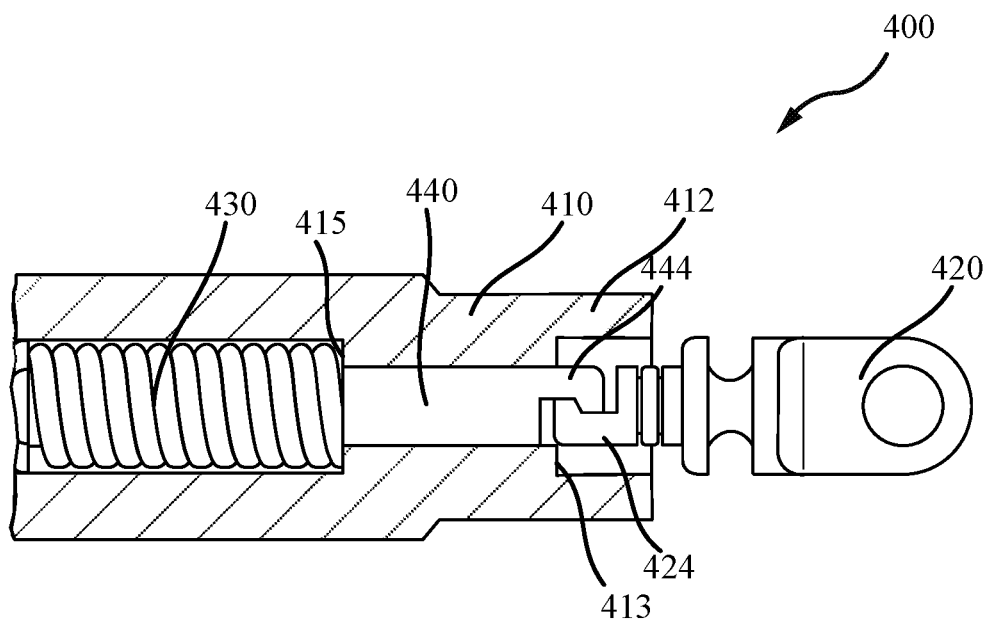
Figure 4C:
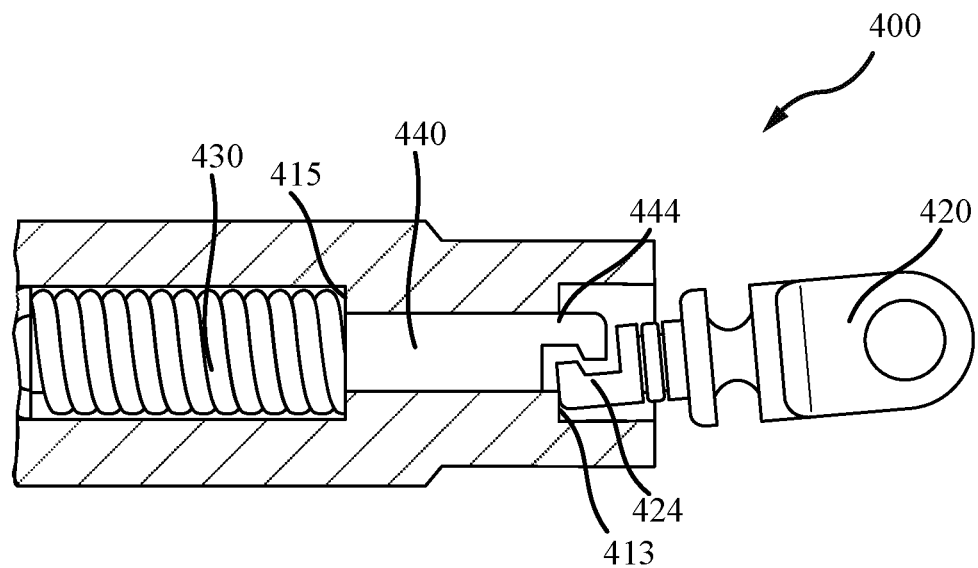
Figure 4D:
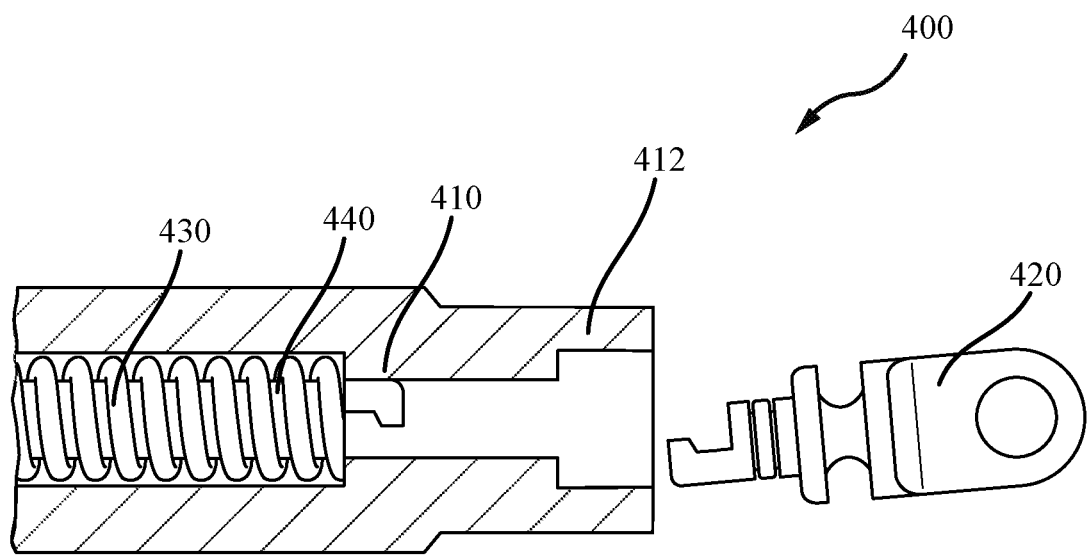

For example, referring now to FIGS. 4A-4D, the mechanical trigger device 400 in use is illustrated, in accordance with various embodiments. FIG. 4A illustrates the mechanical trigger device 400 in the assembled state. With combined reference to FIG. 4B and FIG. 2, as the ejection handle 106 is pulled, the sear 420 may be pulled axially away from the housing 410 and in response, pull the firing pin 440 axially as well. In response, the spring 430 may compress against counterbore 415 of the housing 410. Upon the engagement end 444 of the firing pin 440 and the engagement end 424 of the sear 420 reaching the counterbore 413 at first end 412 of the housing 410, the engagement end 424 of sear 420 may begin to disengage from the engagement end 444 of the firing pin 440 due to the increase in diameter as shown in FIG. 4C. At this stage, the spring 430 may be fully compressed against the counterbore 415 of the housing 410. With reference now to FIG. 4D, After the sear 420 releases from the firing pin 440, the spring 430 may bias the firing pin 440 axially away from first end 412 of the housing 410, resulting in the spring 430 in a neutral state within the housing 410.

Figure 5:
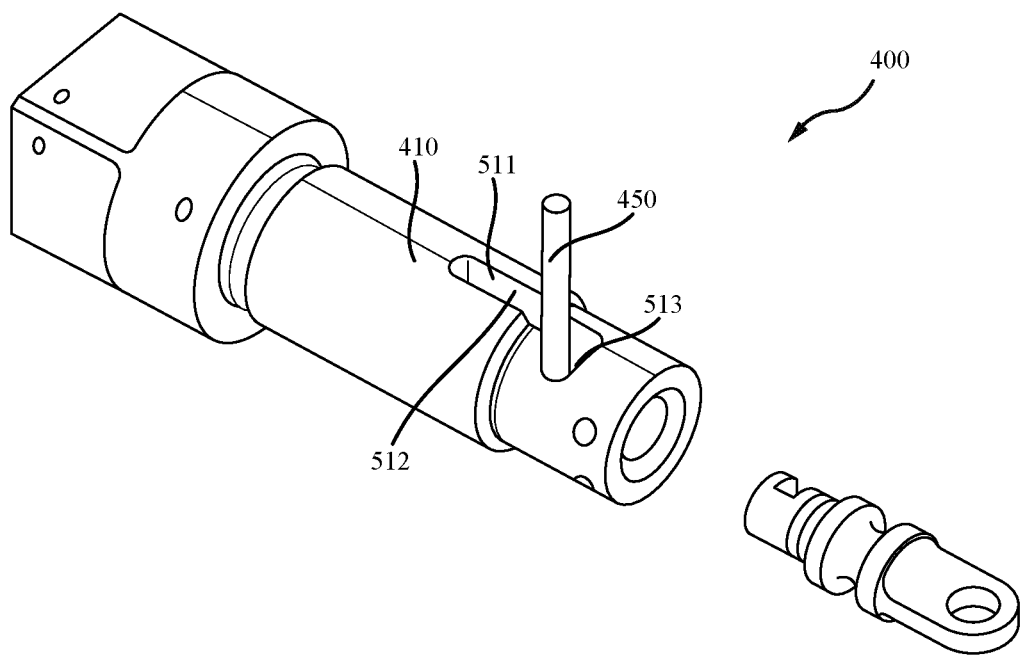
FIG. 5 illustrates a perspective view of an mechanical trigger device in during re-assembly, in accordance with various embodiments.

Referring now to FIG. 5, the mechanical trigger device 400 during re-assembly is illustrated, in accordance with various embodiments. During re-assembly, the reset screw 450 may be disposed in the circumferential portion 513 of the slot 511 of the housing 410. In this regard, with brief reference to FIG. 4C, the engagement end 444 of the firing pin 440 may be disposed in counterbore 413 of the housing. As such, the engagement end 424 of the sear 420 may be re-engaged with the engagement end 444 of the firing pin 440, and the mechanical trigger device 400 may be reset to the assembled state by translating the reset screw 450 back to the axial portion 512 of the slot 511 proximate counterbore 415.

In various embodiments, the mechanical trigger device 400 may be resettable for force evaluations of a typical seat ejection system. In various embodiments, the mechanical trigger device 400 may provide a trainer pilot with training as to a force to pull a typical seat ejection system. In various embodiments, the mechanical trigger device 400 may replace an ejection initiator device for a typical seat ejection system for training and/or evaluation of the system.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A mechanical trigger device, comprising:
    a housing having a slot disposed therethrough, the housing defining a longitudinal axis;
    a firing pin disposed in the housing;
    a spring wrapped around the firing pin; and
    a reset screw extending radially outward from the firing pin through the slot and outward of the housing, the reset screw configured to hold the firing pin in a fixed position against a force of the spring to allow a sear to re-engage the firing pin, wherein:
        the slot comprises an axial portion and a circumferential portion, and
        the reset screw is configured to be pulled axially along the longitudinal axis of the housing toward a first end of the housing and locked in the circumferential portion of the slot.

2. The mechanical trigger device of claim 1, wherein the housing comprises a first counterbore disposed at the first end of the housing extending axially through the housing and a second counterbore disposed axially opposite the first counterbore.

3. The mechanical trigger device of claim 2, wherein the firing pin comprises a retention end and a firing pin engagement end, and wherein the spring is disposed between the retention end and the second counterbore.

4. The mechanical trigger device of claim 3, further comprising the sear configured to engage the firing pin, wherein the sear comprises a sear engagement end configured to engage the firing pin engagement end.

5. The mechanical trigger device of claim 4, wherein the first end is configured to receive the sear, and wherein a second end of the housing is configured to be coupled to a conduit.

6. The mechanical trigger device of claim 4, wherein the sear is configured to disengage and re-engage the firing pin.

7. A method of using the mechanical trigger device of claim 1, the method comprising:
    releasing the sear of the mechanical trigger device from engagement with the firing pin;
        translating the firing pin proximate a first counterbore at the first end of a housing;
        re-engaging the sear with the firing pin;
        translating the firing pin and the sear away from the first end proximate a second counterbore of the housing; and
    re-releasing the sear from engagement with the firing pin.

8. An ejection seat ejection initiation force simulation system, comprising:
    an ejection handle; and
    a mechanical trigger device operably coupled to the ejection handle, the mechanical trigger device configured to release in response to pulling the ejection handle, the mechanical trigger device configured to be re-set to an assembled state after pulling the ejection handle, the mechanical trigger device comprising:
        a housing having a slot disposed therethrough, the housing defining a longitudinal axis,
        a firing pin disposed within the housing,
        a spring wrapped around the firing pin; and
        a reset screw extending radially outward from the firing pin through the slot and outward of the housing, the reset screw configured to hold the firing pin in a fixed position against a force of the spring to allow a sear to re-engage the firing pin, wherein:
            the slot comprises an axial portion and a circumferential portion, and the reset screw is configured to be pulled axially along the longitudinal axis of the housing toward a first end of the housing and locked in the circumferential portion of the slot.

9. The ejection seat ejection initiation force simulation system of claim 8, further comprising a conduit and a rod, wherein the rod is coupled to the sear of the mechanical trigger device, and wherein the conduit is coupled to a second end of the mechanical trigger device.

10. The ejection seat ejection initiation force simulation system of claim 9, wherein the rod is configured to translate the sear away from the housing of the mechanical trigger device in response to pulling of the ejection handle.

11. The ejection seat ejection initiation force simulation system of claim 9, wherein the sear engagement end, wherein the firing pin includes a firing pin engagement end, and wherein the firing pin engagement end engages the sear engagement end in the assembled state.

12. The ejection seat ejection initiation force simulation system of claim 8, wherein the reset screw is coupled to the firing pin of the mechanical trigger device.

13. The ejection seat ejection initiation force simulation system of claim 8, further comprising a conduit and a rod, wherein the rod is coupled to the sear, and wherein the conduit is operably coupled to the ejection handle.

14. The ejection seat ejection initiation force simulation system of claim 13, wherein the conduit is in fluid communication with an ignitor.

\* \* \* \* \*